M. HARLOE.
FILTERING FAUCET.
APPLICATION FILED OCT. 30, 1914.
1,149,911. Patented Aug. 10, 1915.
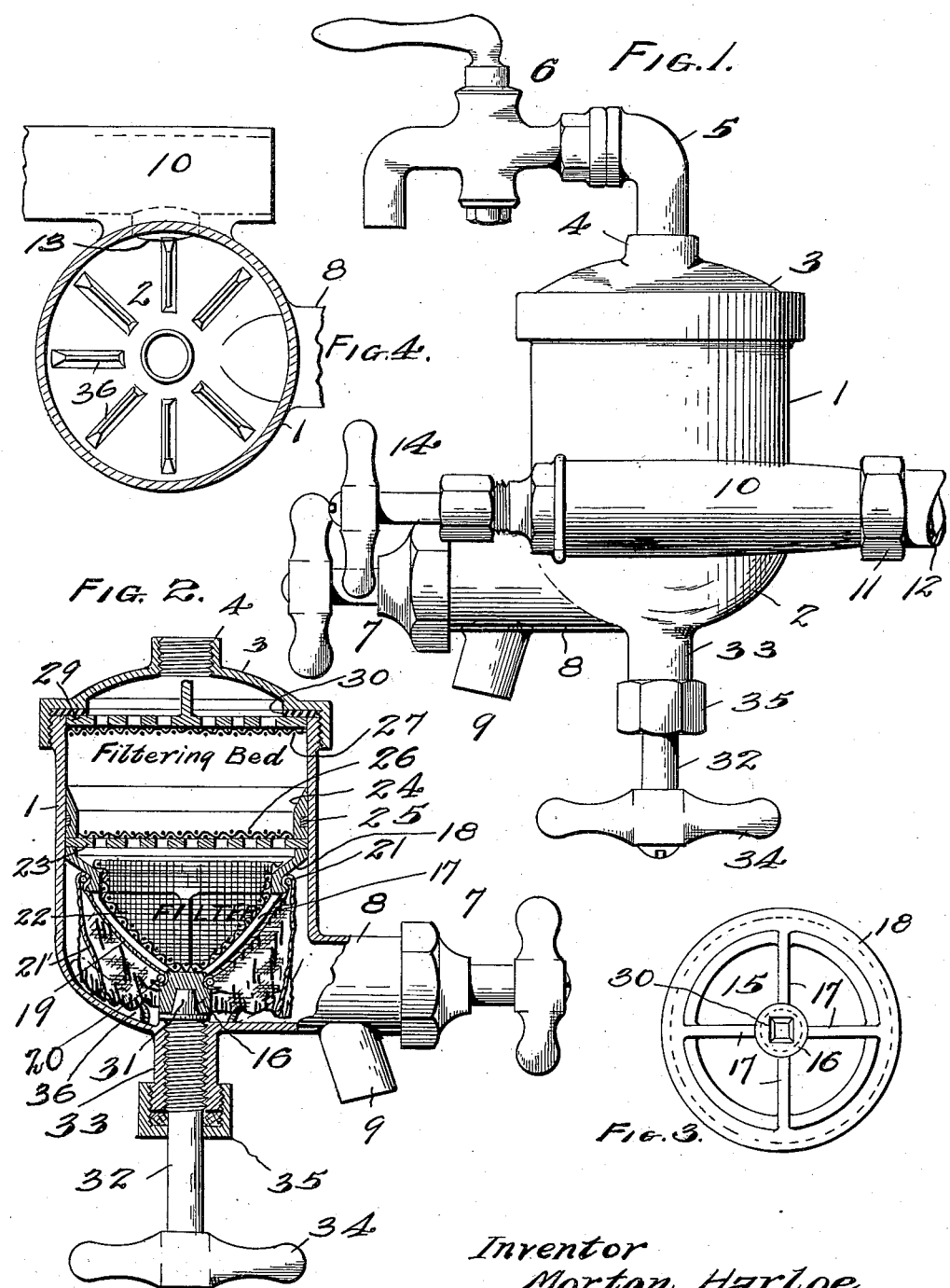
Inventor
Morton Harloe
Chas. K. Davies
Attorney
Witnesses.

UNITED STATES PATENT OFFICE.

MORTON HARLOE, OF WINCHESTER, VIRGINIA.

FILTERING-FAUCET.

1,149,911. Specification of Letters Patent. Patented Aug. 10, 1915.

Application filed October 30, 1914. Serial No. 869,443.

*To all whom it may concern:*

Be it known that I, MORTON HARLOE, a citizen of the United States, residing at Winchester, in the county of Frederick and State of Virginia, have invented certain new and useful Improvements in Filtering-Faucets, of which the following is a specification.

The present invention relates to filtering faucets and is designed to provide a device of this character especially adapted for use in homes and other domestic places, dining rooms, and other public places where the need of such a device is prevalent.
The primary object of the invention is the provision of a simple and inexpensive faucet and filter that may be attached to the usual water pipe at the sink or other convenient attachment in connection with the water system of a dwelling, in order that the water may be properly filtered before being used.

A further object of the invention is to provide facile and efficient means whereby the filter may be cleaned quickly and thoroughly and with slight labor, and the device by means of which the filter is cleaned, is also adapted to perform the additional function of assisting in packing the filtering material in the filter casing.

Further objects and meritorious features will appear hereinafter, and I invite attention to the accompanying drawings in which I have illustrated one complete example of the physical embodiment of my invention constructed according to the best mode I have so far devised for the practical application of the principles of my invention, and such example has proven highly satisfactory in actual use.

Figure 1 is a side elevation of my filtering faucet, complete. Fig. 2 is a vertical central sectional view of the casing, parts of the device being omitted. Fig. 3 is a bottom plan view of a metallic basket located in the interior of the casing of the filter. Fig. 4 is a sectional view of the filter casing showing ribs or ridges on the bottom of the casing used in connection with the rubbing or washing of a cloth or bag within the casing as will be described.

In the preferred embodiment of my invention as illustrated in the drawings the filter casing 1 is cylindrical in shape and provided with a rounded bottom 2, and the upper open end of the casing is closed by the screw cap 3 which is provided with an interiorly threaded boss 4 to which the pipe 5 of the faucet 6 is attached. This faucet 6 is for filtered water and such water may be drawn therefrom after passing through the interior of the filtering casing as will be described.

In addition to the filtered water faucet, I provide a faucet 7 for unfiltered water. This latter faucet is attached at the lower end of the casing to an integral lateral extension 8 of the casing and the water passes through the nozzle 9 of this extension, when drawn from the casing before being filtered.

At the outside of the casing and extending tangentially thereof is an integral tube 10, which forms the inlet for unfiltered water to the casing, and this tube or pipe is coupled as at 11, to the water service pipe 12 which may be located at the sink in the kitchen, or other desirable place in the dwelling. In Fig. 4 the port 13 is indicated as the inlet port for unfiltered water and this port is controlled by the faucet or valve 14.

Located within the interior of the casing and near the bottom thereof is a metallic basket 15 (Fig. 3) which comprises a central hub 16 from which rise four spokes 17 which diverge and support the flaring ring 18, whose greatest diameter is sufficient to neatly fit within the barrel of the filtering casing. This basket forms the skeleton frame work for a cloth cup 19, and this cloth cup or bag is fastened to the basket at the hub portion by means of a wire ring 20, and to the flaring ring 18 by means of another but larger wire ring 21. The hub and flaring ring are grooved to form seats for the cloth and wires which hold the cloth, and in this manner the cloth cup or bag is held taut about the outside of the basket. It will be understood of course that the flexible cloth of which the bag is made is pervious to water and the water passes through this bag after first entering the casing. From the wire 21 at the upper portion of the cloth bag, a flexible wall 21' hangs loosely and extends to the bottom of the casing. This flexible wall it is apparent is a portion of the cloth or fabric which forms the bag 19, and it will be seen that it hangs about the basket in folds and forms a baffle wall for the inflowing unfiltered water through pipe 10.

On the inside of the basket I place a fine wire screen 22, and this screen is filled with suitable filtering material, which is omitted for convenience of illustration in the drawings. Above the screen and resting upon the upper edge of the flaring ring 18 I locate a perforated plate in the shape of a metal disk 23, and preferably there is a smooth contact between the edge of the ring 18 and the bottom face of this disk in order that the basket may be revolved beneath the disk for a purpose as will be described hereinafter.

Above the disk 23 a ring 24, of metal, is interposed and this metal ring is provided with a packing ring 25 in its grooved outer face, in order to make a water tight joint between the ring and the interior surface or wall of the casing. A disk of wire mesh as 26 is illustrated above the perforated disk 23 and upon this screen another filtering bed of suitable material is placed, the bed being capped by the screen disk 27 and the perforated metal disk 29 which latter is directly beneath the rubber gasket 30 located between the casing and its cap.

Thus it is evident that there are two filtering beds in the casing, one in the basket at the bottom of the casing and the other between the screens 24 and 27, and these beds are of suitable material best adapted for filtering the water as it is forced through the casing from the inlet pipe 10 out through the filtered water faucet 6. Upon its entrance to the casing the unfiltered water first encounters the baffle wall 21' of flexible cloth, passes around the wall, through it and under it, and thence through the cloth bag, through the basket and screen and thence through the filtering material in this screen. As the water continues its progress it passes through the perforated plate or disk 23, thence successively through the screen disk, the upper filtering bed, the second screen disk 27 and finally the perforated disk 29 whence it passes up through the cap in a thoroughly and completely filtered condition.

In order to pack and clean the filter, I provide the following described device. In Fig. 3 especially it will be noted there is a rectangular socket 30 formed in the underside of the hub 16, and in Fig. 2 a rectangular boss or head 31 is fitted in this socket. The head is integral with the stem 32 which is threaded into the threaded boss 33 formed at the lower end of the bottom 2 of the casing. A handle 34 is fixed at the end of the stem and a stuffing box or gland 35 prevents leaking of water through the threaded joint.

The manner of packing or adjusting the density of the filtering bed between the screen disks 26 and 27 will be apparent, as it will be seen that by turning the handle 34 clock-wise, the basket, and all members below the ring 24 will be caused to rise, the basket alone turning with the stem, and the other members being lifted bodily in the casing. In this manner the filtering bed is squeezed to proper density between the two disks 26 and 27.

Should any sediment or foreign matter enter through the inlet faucet and pipe 10, this matter settles upon the baffle wall 21', but the accumulated sediment is readily washed or scrubbed from the cloth and washed away by movement of the stem 32 in connection with the flow of water through the inlet pipe and out through the outlet faucet 7 which is opened for the purpose. Thus with the inlet and outlet opened and the water rushing through the rounded bottom of the casing, the handle 34 and stem 32 are revolved alternately to the right and left, quickly, causing a forward and reverse movement of the cloth wall 21'. This movement with the rushing water impinging against the cloth washes its surface. To enhance the cleansing action I utilize radially extending ribs 36 in the bottom of the casing, and the passage of the cloth over these ribs causes a thorough scrubbing of the cloth, as will readily be understood.

What I claim is:—

1. The combination in a filtering faucet including a casing, of a packing device comprising a basket to support filtering material located in the bottom of the casing having a hub and a socket therein, a perforated screen and a disk above the basket, a ring above the disk frictionally engaging the inner wall of the casing and a stem threaded in the casing and engaging said socket.

2. The combination in a filtering faucet including a casing, of a metallic basket supported in the casing having a cloth bag secured to its outside and formed with a flexible baffle wall overhanging the basket.

3. The combination in a filtering faucet including a casing of a revoluble basket and means for revolving said basket, and a cloth bag secured over said basket formed with an overhanging flexible wall.

4. The combination with a filter casing and a bed of filtering material therein, of a movable but non-rotatable support for the bed, a revoluble basket for containing filtering material below the support, a hub on the basket with a socket and a stem threaded in the casing and engaging said socket.

5. The combination in a filter with its casing having radial ribs at its bottom, of a basket revolubly supported in the casing, a cloth bag fixed to the basket and said bag being formed with an overhanging wall about the basket in proximity to said ribs.

In testimony whereof I affix my signature in presence of two witnesses.

MORTON HARLOE.

Witnesses:
A. M. PARKING,
MARION E. TIPPETT.

Copies of this patent may be obtained for five cents each, by addressing the "Commissioner of Patents, Washington, D. C."